R. MEGGINSON.
SEED-MARKER.
No. 185,942. Patented Jan. 2, 1877.
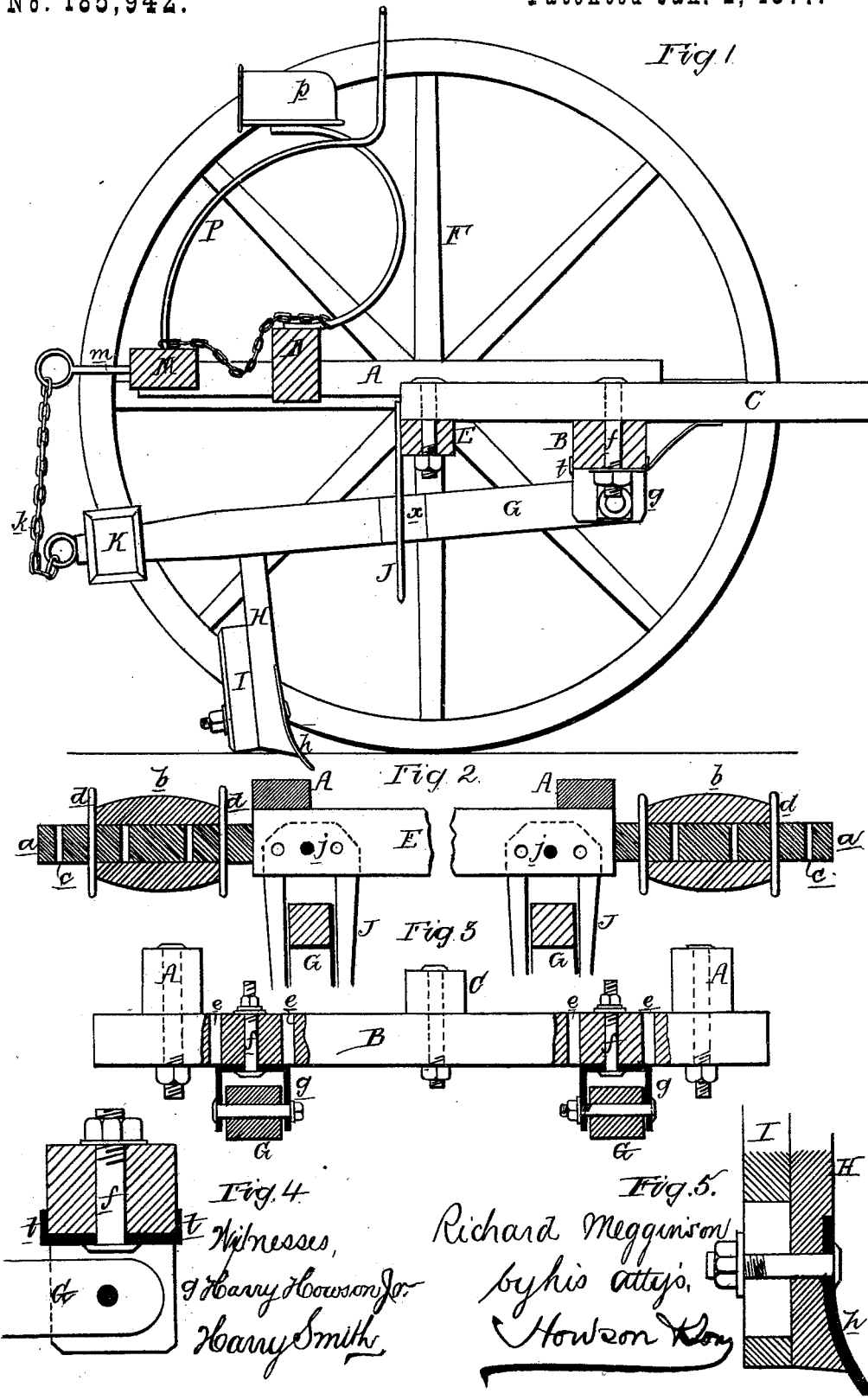

UNITED STATES PATENT OFFICE.

RICHARD MEGGINSON, OF NEW CASTLE, DELAWARE.

IMPROVEMENT IN SEED-MARKERS.

Specification forming part of Letters Patent No. 185,942, dated January 2, 1877; application filed April 29, 1876.

*To all whom it may concern:*

Be it known that I, RICHARD MEGGINSON, of New Castle, New Castle county, Delaware, have invented certain Improvements in Seed-Markers, of which the following is a specification:

My invention relates to certain improvements in machines for forming a series of parallel furrows at equal distances apart, such machines being known as seed-markers; and the object of my invention is to construct the machine in a simple and economical manner, and so that the plow-beams will be securely pivoted to the frame, and that while the plow-shares are held down in the soil they may be readily raised when occasion requires.

These objects I attain in the manner which I will now proceed to describe, reference being had to the accompanying drawing, in which—

Figure 1 is a longitudinal vertical section of my improved seed-marker; Fig. 2, a transverse section on the line 1 2; Fig. 3, a transverse section on the line 3 4; and Figs. 4 and 5 detached sections of different parts of the machine.

The frame of the machine consists of the side bars A A, front bar B, and rear bar D, the axle-tree E being secured to the side frames at a point midway or thereabout between the front and rear bars of the frame. The frame is mounted upon two wheels, F, and has a central pole, C, to which the horses are attached. The axle-tree is reduced in thickness at its outer ends, so as to form circular journals $a$, adapted to the hubs $b$ of the wheels, and these journals have openings $c$, adapted for the reception of linchpins $d$, and so arranged that the hubs of the wheels may be moved laterally to different positions on the journal and secured in position by means of the linchpins. The front bar B of the machine is provided near each end with a number of vertical openings, $e$, arranged at the same distance apart as the linchpin-openings in the journals $a$, and to the front bar, near each end of the same, is secured a flanged bearing, $g$, by a bolt, $f$, passing through one of these openings. To this flanged bearing $g$ is pivoted the front end of a bar, G, carrying at its opposite end a plow-standard, H, to the lower end of which is secured the plow-iron $h$. To the rear of each plow-beam is secured a bar, I, slotted vertically, so that it may be moved up or down and secured after adjustment. The lower end of this bar projects below the lower end of the plow-standard, and by coming in contact with the ground restricts the distance to which the plow-iron enters the same. The axle-tree E is provided with horizontal openings $j$, the centers of which are in line with the centers of the openings $e$ of the bar B, and to the axle-tree at each side of the machine is secured, by means of a bolt passing through one of these openings, a forked guide-plate, J, which embraces one of the bars G, and serves to guide the same in its vertical movement, plates $x$ of anti-friction metal being secured to the sides of the bars G at this point, so as to prevent excessive wear. The rear ends of the bars G are provided with weights K, by which the proper entrance of the plow-irons into the soil is insured, and the rear end of each bar G is connected by means of a chain or cord, $k$, to an arm, $m$, secured to a bar, M, pivoted to the rear ends of the side bars A A of the machine, and capable of being operated, so as to cause the raising and lowering of the plows by means of a spring-arm, P, extending upward, so as to be within easy reach of the operator upon the seat $p$. This seat $p$ is secured to the beam D in the rear of the axle, so that the operator whose feet rest upon the front beam B, can by throwing his body slightly backward, elevate the front portion of the machine, and remove the weight from the horse's back. The bearings $g$, to which the front ends of the bars G are pivoted, are of peculiar construction, having, besides the ears through which the pivot-pin passes, lugs $t$, which are turned upward, so as to clasp the front and rear edges of the beam B, thereby insuring the longitudinal steadiness of the bearings, and removing a portion of the strain from the bolts $f$. The distance from the centers of the wheels F to the centers of the plow-beams, when the latter are properly adjusted, is just half the distance between the plow-beams themselves, so that when the machine arrives at one end of the field it is turned around and the wheel-track acts as a guide in returning, the furrows being thus made at a uniform distance apart.

It will be evident that by providing the beam B, axle-tree E, and its journals $a$ with a series of openings, as described, the lateral adjustment of the wheels, plow-beams, and guides can be very readily effected, and the distance apart of the furrows thereby readily changed to suit varying circumstances.

I claim as my invention—

1. The combination of the pivoted bars G, carrying the plow-beams, and having weights K, with the arm P and devices, substantially as described, by which the said bars can be raised during the operation of the machine, as set forth.

2. The combination of the bars G and their weights with the plow-standards H and their bars I, as and for the purpose set forth.

3. The bearing $g$, constructed substantially as described, and having ears, to which the bar G is pivoted, in combination with the bar embraced on opposite sides by the lugs $t\,t$ of the said bearing, all as set forth.

In testimony whereof I have signed my name to this specification in the presence of two subscribing witnesses.

RICHARD MEGGINSON.

Witnesses:
JOHN BARTHOLOMEW,
A. E. DAVIDSON.